(No Model.)
W. P. STEWART.
WIRE HOLDER AND CARRIER.
No. 300,813. Patented June 24, 1884.
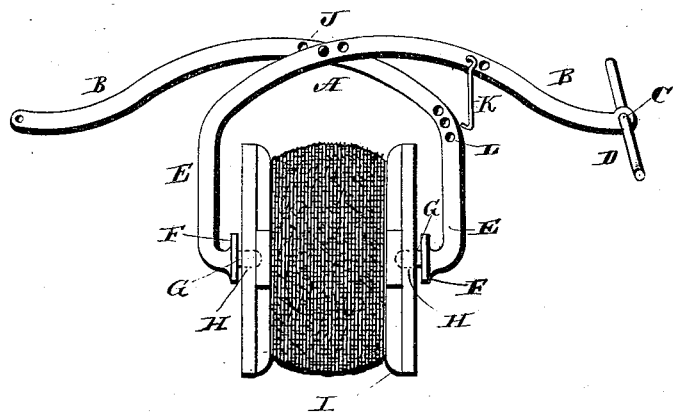
WITNESSES
Geo. F. Downing
William H. Ruff
INVENTOR
Wm P. Stewart
By Leggett & Leggett
ATTORNEY
N. PETERS, Photo-Lithographer, Washington, D. C.

UNITED STATES PATENT OFFICE.

WILLIAM PERCY STEWART, OF NATCHEZ, MISSISSIPPI.

WIRE HOLDER AND CARRIER.

SPECIFICATION forming part of Letters Patent No. 300,813, dated June 24, 1884.

Application filed April 23, 1884. (No model.)

*To all whom it may concern:*

Be it known that I, WILLIAM PERCY STEWART, of Natchez, in the county of Adams and State of Mississippi, have invented certain new and useful Improvements in Wire Holders and Carriers; and I do hereby declare the following to be a full, clear, and exact description of the invention, such as will enable others skilled in the art to which it appertains to make and use the same.

My invention relates to an improvement in holders and carriers for barb-wire, the object of the same being to provide a device of this character by means of which barb and other wires may be easily and conveniently transported from place to place, a further object being to provide a carrier which will be economical in construction and durable and efficient in use; and with these ends in view my invention consists in a pair of angular tongs or arms provided with grappling ends, which latter are so shaped as to form journals or spindles upon which the drums or reels revolve, whereby wire coiled or wound around the same may be easily unwound, as desired.

My invention further consists in certain features of construction and combination of parts, as will be more fully described, and pointed out in the claims.

In the drawing the figure shown is a view of my improvement attached to a drum or reel.

A represents a pair of angular grappling-arms, made of any desired material, and preferably formed as shown, and having the free ends B thereof extending a suitable distance over the sides of the drum when attached in position for use. The free ends B are provided with perforations C, in which are secured the rods or hand-bars D; or, if desired the latter may be dispensed with, and the ends may be suitably shaped for the accommodation of the hands. The grappling ends E are curved inwardly, as shown, and are provided with the collars or flanges F, attached thereto or formed integral therewith. The arms E are also provided with the spindles G, adapted to enter and loosely fit within sockets H, formed in a spool-shaped drum or reel, I, which revolves thereon. The arms A are pivotally secured together by means of a pivot or bolt which passes through the perforations J, adapted to serve this purpose. I provide two or more perforations J in each arm, for convenience in adapting the arms to drums of different lengths, and retaining the spindles in proper angles for allowing easy rotation of the drum or reel. The hook K is suitably fastened in one of the arms, as shown, and is adapted to lock in the holes L, which may be two or more in number, the object thereof being to lock the arms in the several adjustments required for different lengths of drums and reels, also to prevent the collars from bearing too tightly against the sides of the drum or reel.

I would have it understood that I do not limit myself to the carrying of wire, as my device may be equally useful in transporting or carrying hose, rope, or other like articles.

This device is simple in construction, durable and efficient in use, and can be made at a small initial cost.

Having fully described my invention, what I claim as new, and desire to secure by Letters Patent, is—

1. In a device for carrying or holding wire, the combination, with a drum or reel, of arms pivoted to each other and formed with bent lower ends adapted to engage with said reel, substantially as set forth.

2. In a device for carrying or holding wire, the combination, with a drum or reel centrally provided on its sides with sockets, of bent arms pivoted together above the reel and formed with bent ends adapted to loosely fit in said sockets, said ends being provided with flanges or collars, substantially as set forth.

3. In a device for carrying or holding wire, the combination, with a drum or reel, of arms pivoted together and adapted to engage said reel, and a hook loosely secured to one of said arms, adapted to engage in perforations formed in the other of said arms, substantially as set forth.

4. In a device for carrying or holding wire, the combination, with a drum or reel centrally provided on its sides with recesses, of bent arms pivoted together above the reel, the lower ends of which are bent and provided with collars or flanges, and adapted to loosely engage in said sockets, and a hook loosely secured to one arm and adapted to engage in perforations on the other, substantially as set forth.

In testimony whereof I have signed this specification in the presence of two subscribing witnesses.

WILLIAM PERCY STEWART.

Witnesses:
FRED J. V. LE CAND,
H. G. MILLSAPS.